Figure 1:
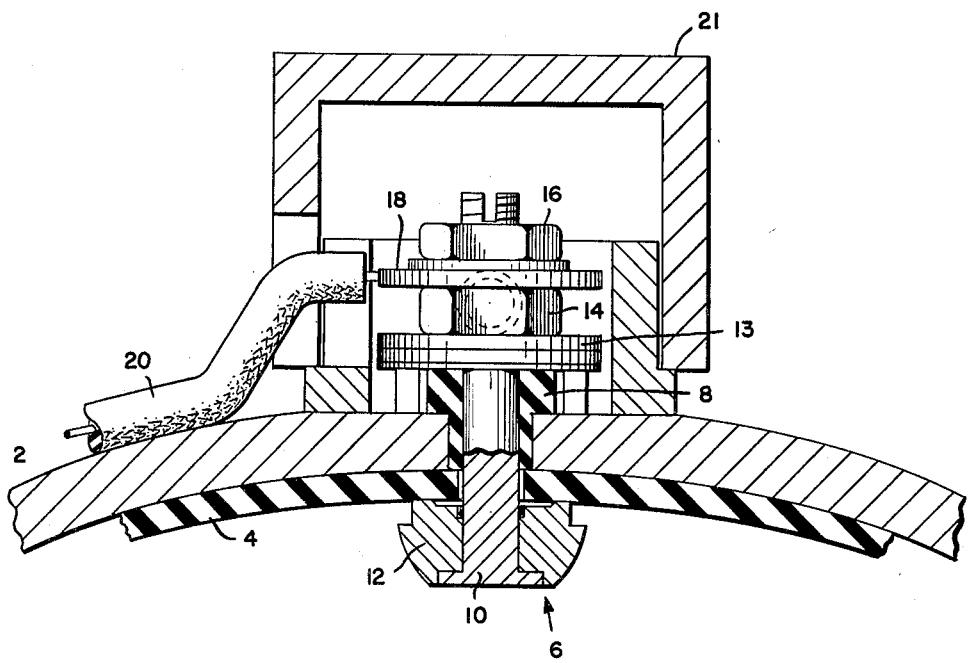

April 13, 1965 K. FISCHER 3,177,709
MAGNETIC FLOWMETER
Filed April 4, 1961 2 Sheets-Sheet 1

INVENTOR.
KERMIT FISCHER
BY
ATTORNEYS

April 13, 1965

K. FISCHER 3,177,709

MAGNETIC FLOWMETER

Filed April 4, 1961

2 Sheets-Sheet 2

INVENTOR.
KERMIT FISCHER
BY

ATTORNEYS

United States Patent Office 3,177,709
Patented Apr. 13, 1965

3,177,709
MAGNETIC FLOWMETER
Kermit Fischer, Furlong, Pa., assignor to Fischer & Porter Company, Warminster, Pa., a corporation of Pennsylvania
Filed Apr. 4, 1961, Ser. No. 120,809
5 Claims. (Cl. 73—194)

This invention relates to magnetic flowmeters of the type in which a potential induced in a liquid flowing through a magnetic field is utilized as a measure of quantity of flow.

As is well known, the current or potential outputs produced in a flowmeter of the magnetic type are very small for ordinary flows to be measured. Currents are particularly small when the fluid which is being measured has a high resistivity. It is accordingly necessary to design a flowmeter of this type in such fashion as to maximize the output, subject to such limitations as the strength of the magnetic field or other factors which are involved in the magnitude of the output.

In such flowmeters pickup is secured by means of electrodes located on an axis transverse to the conduit and transverse to the magnetic field which is provided. These electrodes conductively contact the fluid, and while in preferred forms of measurement a null balance is used so that the net current through the electrodes is reduced substantially to zero, the error signals do involve current flow through the electrodes and hence it is desirable to have the electrode-to-fluid contacts of as low resistance as possible.

Particularly troublesome is the matter of measurement of sludge flows involved in the treatment of sewage. The sewage will ordinarily contain grease of relatively high resistivity, and as this grease builds up it may achieve a thickness which greatly increases the resistance involved at the electrode surfaces. Such build up occurs particularly when the flowing sewage is cold and the grease approaches a solid state.

The accumulation of grease has been recognized as a disturbing factor in securing sensitivity, and proposals have been made for local heating of the electrodes to liquify the grease so that it may be washed away by the flow. Electrical heating means, however, are undesirable, even if direct current is used, because of the fact that heating current will introduce electrical noise, either due to itself or to pickup by the required current leads, this noise being added to the minute signals which are useful.

In accordance with the present invention heating is effected by derivation of the heating power from the magnetic field producing means. Since this power has the same source as that giving rise to the field and to the useful signals, and a proportionality is maintained, the heating is accomplished without detriment to the useful signals. Specifically, in accordance with the invention, an arrangement is used in which eddy currents provide the heating effect. Usually, when metal conduits have been used they have been of stainless steel. Stainless steel has a high resistivity and, for a given excitation of the magnetic field, the eddy currents produced therein are small and ineffective to provide substantial heating. In accordance with the invention a conduit material is used in the vicinity of the electrodes which has a low resistivity, far less than that of stainless steel, so that there is a considerable and adequate heating effect. The electrodes themselves are desirably also of high conductivity material so that eddy currents therein also produce substantial heating. In a preferred arrangement, the conduit is of aluminum or a high conductivity alloy thereof, and a large proportion of the mass of the electrodes is formed of silver.

Figure 2:
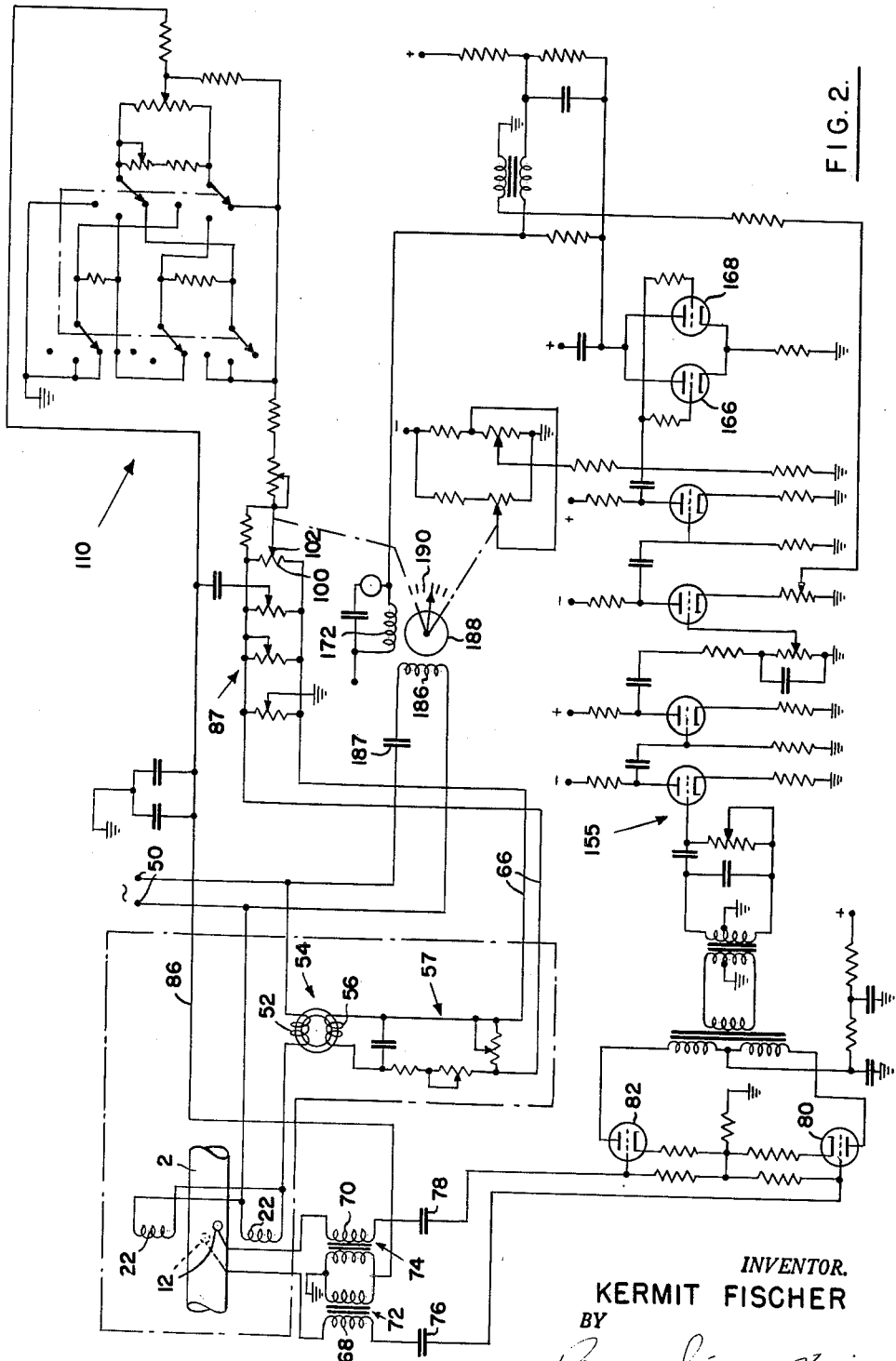

The general object of the invention is to provide a flowmeter involving heating in the fashion just indicated. This general object together with others relating to details will become apparent from the following description, read in conjunction with the accompanying drawing, in which:

FIGURE 1 is a fragmentary section of a preferred form of a meter showing details of an electrode assembly; and FIGURE 2 is a wiring diagram showing the electrical aspects of the flowmeter.

While a particular flowmeter is illustrated, and will be described herein, it will be evident that the invention may be applied to flowmeters having different constructions and, in particular, different electrical systems for the measurement of the flow. To present a consistent picture, however, the disclosure, particularly in its electrical aspects, follows that of the application of Kass, Serial No. 768,595, filed October 21, 1958 now Patent No. 3,094,000. Reference may be made to that patent for details.

Referring first to FIGURE 1, there is illustrated an electrode assembly which is duplicated at a diametrically opposite point of the conduit. A line joining the electrodes is substantially at right angles to the alternating magnetic field providing excitation. The conduit, indicated at 2, is, in accordance with the present invention, preferably formed of aluminum or a high conductivity alloy thereof. The conduit may have any suitable diameter to accommodate the flow involved, and will have a wall thickness suitable to sustain the pressures of the liquid which may be involved. If pressure considerations are important, they alone may give rise to a sufficient wall thickness of the aluminum exceeding that which might ordinarily be used under the same pressure conditions if stainless steel tubing was used. However, irrespective of pressure conditions the aluminum wall should have substantial thickness to achieve in best fashion the objectives of the invention, since the eddy currents produced will be larger as the wall thickness is increased. It has been found, for example, that an aluminum wall thickness should desirably be of the order of ¼ inch or greater, though under conditions when less heating is required for proper operation the thickness may be less. As will be later pointed out, it is the relatively high conductivity of the conduit material which is of major importance.

In order to prevent short-circuiting action, the conduit is desirably lined with an insulator 4 such as Teflon applied to the interior of the conduit. This liner need not be continuous, but may be provided in accordance with the disclosure of the application of Mannherz and McDermott, Serial No. 92,268, filed February 28, 1961.

Each electrode assembly is generally designated at 6 and comprises an insulating bushing 8 set in the wall of the conduit and mounting, so as to be insulated from the wall, a radially extending threaded pin 10 which may be of stainless steel. In accordance with the invention the inner end of the electrode is desirably provided by a button 12 of silver which forms a somewhat massive head and is rounded at its exposed face to provide for more effective removal of grease by the flow, a flange on the inner end of the pin 10 being desirably inset flush with the exposed face of the button. The button, for example, may effectively present approximately a hemisphere having a radius of about ¼ inch. The inner end of the pin 10 is threaded to receive a clamping nut 14 with the interposition of spacers 13 to provide a clamping assembly which, as will be evident, insulates the electrode from the conduit 2.

Another nut 16 clamps a lug 18 secured to the conductor of an insulated lead 20 which provides for delivery of the signal. Shielding is provided to minimize pickup of electrical noise and as part of this shielding the exposed portion of the electrode assembly is covered by a metallic cap 21.

Before going into the measuring system, the considerations involved in the present invention may be discussed. As already indicated, an alternating magnetic field is used for excitation, and desirably this magnetic field may be substantially increased in intensity over that which might be used if heating considerations were not involved. Since this magnetic field, applied by windings and a core assembly as described in said Kass application encompasses the metal of the conduit 2 in the vicinity of the electrodes, eddy currents will flow in the metal of the conduit and in the electrodes themselves, particularly in the buttons 12. Using, for example, aluminum or an aluminum alloy for the conduit and silver (or aluminum) for the buttons, the heating effect of the eddy curents may be quite substantial, and typically the temperatures of the electrodes and in their vicinity may rise to 70° F. or more above the temperature of the flowing liquid. Such temperature rise will ordinarily sufficiently soften or melt grease which may tend to accumulate so that this will be washed away leaving, at the minimum, only a thin film of grease which will have sufficient conductivity so as not to provide a deleterious resistance at the area of contact between the electrodes and the flowing liquid.

The reason for the use of aluminum for the conduit, and aluminum or silver for the electrodes is that the eddy currents are greatly increased by such expedient. Remembering that the source of the heating effect is in the nature of a voltage, the voltage being fixed, so that the power involved in the eddy currents is of the type $E^2/R$, it will be evident that the lower the resistances involved, the higher will be the power dissipated as heat. The use of aluminum or a good conducting alloy thereof in place of stainless steel involves a reduction of resistivity of the order of around 1/30. Stainless steel of the usually commercially applicable type has a resistivity of about 73 microohm-centimeter, whereas aluminum has a resistivity of the order of 2.6 microohm-centimeter. While even more conductive materials could be used for the conduit, aluminum or aluminum alloy is most practical, both copper and silver which have less resistivity being much more expensive. (The advantages of silver or copper over aluminum are not particularly material; silver has a resistivity of about 1.6 microohm-centimeter and copper has a resistivity of about 1.7 microohm-centimeter, neither of these being sufficiently lower than that of aluminum to justify the higher cost. Furthermore, it should be noted that the resistivities are in terms of volume, and for equal weights aluminum has considerable advantages.) As already indicated heavier wall thickness of the aluminum conduit is desirable since this reduces actual resistance, increasing the power dissipation in the form of heat.

It may be here noted that in the claims the term "aluminum" is intended to include alloys thereof of comparable resistivities.

In the case of the buttons 12, silver may be used because of its resistance to corrosion, though aluminum is satisfactory. Copper may be used but it has the disadvantage of being rapidly corroded.

In order to enhance the heating effect and still secure the same magnitude of output signal as would be secured using a stainless steel conduit, the magnetic field windings may be fed at a higher voltage, or, in other fashion, as by parallel feed of windings more volt-amperes may be provided to supply the heating power.

For the purpose of disclosing a complete magnetic flowmeter embodying the invention, there may now be described the associated electrical matters which are set forth in detail in said Kass application. Windings 22 associated with an iron core structure provide the field which is at right angles to the diameter through the electrodes.

Referring now to FIGURE 2, alternating current is supplied from the terminals 50 connected to the usual power supply, for example at sixty cycles. The magnetic field windings 22 are connected in parallel and to the supply terminals. In series with the field windings there is the primary winding 52 of a toroidal transformer 54 the secondary winding 56 of which is connected to an adjusting network from which an output is taken through lines 66.

The leads from the electrodes 12 are connected individually through the secondaries 68 and 70 of identical transformers 72 and 74, and through the capacitors 76 and 78 to the grids of input triodes 80 and 82 forming part of an amplifier generally indicated at 155. The primaries of the transformers 72 and 74 are connected in parallel between ground and a line 86 in such fashion that signals fed back through the line 86 will null the signals from the electrodes, the connection being such that opposition to the electrode potential is provided by each transformer.

The line 86 receives current from the lines 66 previously mentioned through a network 87 and a range adjustment network 110. The network 87 comprises adjustments for centering, setting the input resistance, and for manual null control of quadrature signals. It also includes a potentiometer 100 provided with a contact 102 which is driven by a motor 188 to effect automatic balancing of the circuit and provide on a scale 190 a direct indication of flow.

The amplifier 155 terminates in a pair of power tubes 166 and 168 operating as a class C stage. This stage supplies current to the field winding 172 of the motor 188, the other field winding 186 of this motor being provided with current from the terminals 50 through the phase adjusting capacitor 187.

The operation of the measuring system is described in detail in said Kass application, and since the details of operation are not of special significance in connection with the present invention it will suffice to point out that when the circuit in FIGURE 2 is not balanced inputs are provided to the triodes 80 and 82 and through the amplifier 155 the motor 188 is operated in one direction or the other, as required to attain balance, with resulting provision of a signal through connection 86 to balance the circuit, i.e. to provide zero in-phase signals to the triodes 80 and 82. When balance has been thus achieved (through adjustment of contact 102 of potentiometer 100) the flow may be directly read on the scale 190.

It will be evident that other indicating or recording devices may be used, with full achievement of the advantageous results of the invention. It will also be clear that various details of construction may be changed without departing from the scope of the invention as defined in the following claims.

What is claimed is:

1. A flowmeter comprising a metallic conduit for flowing liquid, electromagnetic means providing an alternating magnetic field transverse to said conduit and threading said conduit, means supplying alternating current to said electromagnetic means, electrodes insulated from said conduit, exposed to liquid flowing through said conduit, and located on a line extending transversely through said field to pick up signals generated by flow of liquid through said field, means insulating the interior of the conduit from the liquid at its portion threaded by said magnetic field, and means connected to said electrodes for measuring said signals, said conduit in at least its portion threaded by said magnetic field having a wall thickness of at least one-quarter inch and being of aluminum whereby said portion of the conduit has large eddy currents produced therein by the alternating magnetic field to produce heating to avoid accumulation of grease on the electrodes.

2. A flowmeter comprising a metallic conduit for flowing liquid, electromagnetic means providing an alternating magnetic field transverse to said conduit and threading said conduit, means supplying alternating current to said electromagnetic means, electrodes insulated from said conduit, exposed to liquid flowing through said conduit, and located on a line extending transversely through said field to pick up signals generated by flow of liquid through said field, means insulating the interior of the conduit from the liquid at its portion threaded by said magnetic field, and means connected to said electrodes for measuring said signals, said conduit in at least its portion threaded by said magnetic field having a wall thickness of at least one-quarter inch and being of a metal of the group consisting of aluminum, copper and silver, and each of said electrodes having a massive portion in contact with the liquid and formed of a metal of the group consisting of aluminum and silver whereby both said portion of the conduit and said massive portions of the electrodes have large eddy currents produced therein by the alternating magnetic field to produce heating to avoid accumulation of grease on the electrodes.

3. A flowmeter comprising a metallic conduit for flowing liquid, electromagnetic means providing an alternating magnetic field transverse to said conduit and threading said conduit, means supplying alternating current to said electromagnetic means, electrodes insulated from said conduit, exposed to liquid flowing through said conduit, and located on a line extending transversely through said field to pick up signals generated by flow of liquid through said field, means insulating the interior of the conduit from the liquid at its portion threaded by said magnetic field, and means connected to said electrodes for measuring said signals, said conduit in at least its portion threaded by said magnetic field having a wall thickness of at least one-quarter inch and being of aluminum, and each of said electrodes having a massive portion in contact with the liquid and formed of a metal of the group consisting of aluminum and silver whereby both said portion of the conduit and said massive portions of the electrodes have large eddy currents produced therein by the alternating magnetic field to produce heating to avoid accumulation of grease on the electrodes.

4. A flowmeter comprising a metallic conduit for flowing liquid, electromagnetic means providing an alternating magnetic field transverse to said conduit and threading said conduit, means supplying alternating current to said electromagnetic means, electrodes insulated from said conduit, exposed to liquid flowing through said conduit, and located on a line extending transversely through said field to pick up signals generated by flow of liquid through said field, means insulating the interior of the conduit from the liquid at its portion threaded by said magnetic field, and means connected to said electrodes for measuring said signals, said conduit in at least its portion threaded by said magnetic field having a wall thickness of at least one-quarter inch and being of a metal of the group consisting of aluminum, copper and silver, and each of said electrodes having a massive portion in contact with the liquid and formed of silver whereby both said portion of the conduit and said massive portions of the electrodes have large eddy currents produced therein by the alternating magnetic field to produce heating to avoid accumulation of grease on the electrodes.

5. A flowmeter comprising a metallic conduit for flowing liquid, electromagnetic means providing an alternating magnetic field transverse to said conduit, and threading said conduit, means supplying alternating current to said electromagnetic means, electrodes insulated from said conduit, exposed to liquid flowing through said conduit, and located on a line extending transversely through said field to pick up signals generated by flow of liquid through said field, means insulating the interior of the conduit from the liquid at its portion threaded by said magnetic field, and means connected to said electrodes for measuring said signals, said conduit in at least its portion threaded by said magnetic field having a wall thickness of at least one-quarter inch and being of aluminum, and each of said electrodes having a massive portion in contact with the liquid and formed of silver whereby both said portion of the conduit and said massive portions of the electrodes have large eddy currents produced therein by the alernating magnetic field to produce heating to avoid accumulation of grease on the electrodes.

References Cited by the Examiner
UNITED STATES PATENTS

| 2,338,236 | 1/44 | Ferris | 219—6.5 X |
| 2,766,621 | 10/56 | Raynsford et al. | 73—194 |
| 2,844,568 | 7/58 | Mertz | 260—83.7 |

OTHER REFERENCES

Article: by Guelke et al. published in Journal of The Institution of Electrical Engineers, vol. 94, Issue parts 2 and 2; Pages 71–74 1947.

RICHARD C. QUEISSER, *Primary Examiner.*